(12) United States Patent
Berger et al.

(10) Patent No.: US 10,495,008 B2
(45) Date of Patent: Dec. 3, 2019

(54) COMBUSTION GAS INJECTOR ASSEMBLY AND METHOD

(71) Applicant: L'Orange GMBH, Stuttgart (DE)

(72) Inventors: Ingmar Berger, Stuttgart (DE); Hans-Joachim Koch, Glatten (DE); Michael Nitsche, Schwieberdingen (DE); Steffen Siebert, Schonaich (DE)

(73) Assignee: L'Orange GMBH, Stuttgart (DE)

( * ) Notice: Subject to any disclaimer, the term of this patent is extended or adjusted under 35 U.S.C. 154(b) by 0 days.

(21) Appl. No.: 16/073,724

(22) PCT Filed: Jan. 19, 2017

(86) PCT No.: PCT/EP2017/000065
§ 371 (c)(1),
(2) Date: Jul. 27, 2018

(87) PCT Pub. No.: WO2017/129354
PCT Pub. Date: Aug. 3, 2017

(65) Prior Publication Data
US 2019/0010878 A1    Jan. 10, 2019

(30) Foreign Application Priority Data
Jan. 28, 2016   (DE) .................. 10 2016 000 894

(51) Int. Cl.
*F02D 19/02* (2006.01)
*F02M 21/02* (2006.01)
(Continued)

(52) U.S. Cl.
CPC .......... *F02D 19/024* (2013.01); *F02B 23/101* (2013.01); *F02D 19/0689* (2013.01);
(Continued)

(58) Field of Classification Search
CPC ............... F02M 21/0284; F02M 43/04; F02M 21/0275; F02M 21/0215; F02D 19/024;
(Continued)

(56) References Cited

U.S. PATENT DOCUMENTS

2005/0081827 A1* 4/2005 Grant .................... F02M 25/10
123/470
2012/0325180 A1* 12/2012 Montgomery ...... F02D 41/3094
123/299
(Continued)

FOREIGN PATENT DOCUMENTS

DE   102014207473 A1   10/2015
WO   WO2011130832 A1   10/2011
(Continued)

OTHER PUBLICATIONS

PCT International Search Report and Written Opinion of the International Searching Authority, PCT/EP2017/000065, dated Jun. 12, 2017, 12 pages.
(Continued)

*Primary Examiner* — Sizo B Vilakazi
(74) *Attorney, Agent, or Firm* — Fish & Richardson P.C.

(57) ABSTRACT

The invention relates to a combustion gas injector assembly (1) comprising a combustion gas injector (3) having groups (11*a,b,c*) of combustion gas nozzle openings distributed around the periphery, each group having at least one combustion gas nozzle opening (13), a combustion gas nozzle valve member (9*a,b,c*) of the combustion gas injector (3), which member can be controlled in the open position and closed position, is associated with each group (11*a,b,c*) of combustion gas nozzle openings, in order to selectively discharge the combustion gas via the at least one combustion gas nozzle opening (13). The combustion gas injector assembly (1) is configured to control the combustion gas
(Continued)

nozzle valve members (9a,b,c) successively with a predetermined time offset (T) into the closed position.

18 Claims, 4 Drawing Sheets

(51) Int. Cl.
*F02D 19/06* (2006.01)
*F02B 23/10* (2006.01)

(52) U.S. Cl.
CPC ..... *F02D 19/0692* (2013.01); *F02M 21/0215* (2013.01); *F02M 21/0275* (2013.01); *F02M 21/0284* (2013.01); *F02B 2023/108* (2013.01)

(58) Field of Classification Search
CPC ............... F02D 19/061; F02D 19/0692; F02D 19/0694; F02D 19/0689; F02B 23/101; F02B 2023/108; Y02T 10/32; Y02T 10/36
See application file for complete search history.

(56) References Cited

U.S. PATENT DOCUMENTS

| 2017/0082058 A1* | 3/2017 | Katakura | F02D 41/38 |
| 2017/0114998 A1* | 4/2017 | Mueller | F02B 23/0651 |
| 2017/0284329 A1* | 10/2017 | Ashizawa | F02D 41/3047 |
| 2019/0063344 A1* | 2/2019 | Matsumoto | F02B 23/0624 |

FOREIGN PATENT DOCUMENTS

| WO | WO2012155122 A2 | 11/2012 |
| WO | WO2015101406 | 7/2015 |

OTHER PUBLICATIONS

International Preliminary Report on Patentability in International Application No. PCT/EP2017/000065, dated Aug. 9, 2018, 14 pages with English Translation.

* cited by examiner

COMBUSTION GAS INJECTOR ASSEMBLY AND METHOD

CROSS-REFERENCE TO RELATED APPLICATIONS

This application is a U.S. National Phase application under 35 U.S.C. § 371 and claims the benefit of priority to International Application Serial No. PCT/EP2017/000065, filed on Jan. 19, 2017, which claims priority to German Application No. 102016000894.6, filed on Jan. 28, 2016, the contents of which are hereby incorporated by reference.

The present invention relates to a combustion gas injector assembly according to the preamble of claim 1. The invention also relates to a method according to the preamble of claim 11.

Generic combustion gas injector assemblies, in which a combustion gas injector has numerous combustion gas nozzle valve elements, usually nozzle needles, are known in the prior art e.g. from WO2015/101406 A1. In these combustion gas injector assemblies for gas engine combustion, the combustion gas is blown directly into the combustion chamber at high pressure, exceeding, e.g., 300 bar, with the goal of minimizing the amount of unburned combustion, e.g. methane, in comparison with conventional gas engines with a homogenous gas/air mixture. The problem with this is that the combustion gas quickly becomes "stationary" after the combustion gas has been blown in, i.e. after one of the respective nozzle valve elements has been closed, i.e. this residual gas is no longer burned.

Based on this, the fundamental object of the present invention is to create a combustion gas injector assembly and a method that can be carried out therewith, which enable an improvement in residual gas combustion.

This object is achieved with a combustion gas injector assembly that has the features of claim and a method that has the features of claim 11, respectively.

Advantageous further developments and embodiments of the invention are given in the other claims.

According to the invention, a combustion gas injector assembly is proposed that has a combustion gas injector. The combustion gas injector can be a single-fuel fuel injector, e.g. preferably part of a dual-fuel fuel injector, which can also be provided for use with a liquid fuel, e.g. diesel fuel, biofuel, or heavy fuel oil. The combustion gas injector is provided for use with a gaseous fuel, or combustion gas, e.g. natural gas, specialty gas, landfill gas, hydrogen, or some other combustion gas, i.e. that is to be blown or injected into a combustion chamber. When used as part of a dual-fuel fuel injector, the combustion gas injector may be provided in particular for a pilot injection mode in the scope of a combustion gas operating mode (liquid fuel pilot injection for igniting the gaseous fuel). The combustion gas injector can be used, e.g., with a large engine, e.g. provided in a motor vehicle such as a ship, a locomotive, or a utility or special purpose vehicle, or for a stationary apparatus, e.g. for a combined heat and power plant, an (emergency) generator, and also for industrial applications, for example.

The combustion gas injector has groups of combustion gas nozzle openings, distributed over a circumference (thereof), preferably evenly, each of which has at least one combustion gas nozzle opening. By way of example, the combustion gas injector has three combustion gas nozzle opening groups—distributed over its circumference each—of which has two or three combustion gas nozzle openings. This preferably results in an assembly with respect to the (radial) central axis of the combustion gas nozzle opening groups, in which these groups are offset 120° to one another over the circumference.

A respective combustion gas nozzle opening group is dedicated in the combustion gas injector to each combustion gas nozzle valve element, which can be opened or closed for a selective combustion gas injection via its at least one combustion gas nozzle opening. A respective combustion gas nozzle valve element is preferably an integral nozzle needle, which can furthermore be raised and lowered (axially). Moreover, the combustion gas injector assembly is also preferably configured in the framework of the invention to inject combustion gas in the framework of the respective combustion gas injection event (blowing in)—which is to be carried out with the combustion gas injector—in each case via all of the combustion gas nozzle opening groups, or the combustion gas nozzle openings of the combustion gas injector, i.e. each of the combustion gas nozzle valve elements participates in the combustion gas injection event, or is opened. The respective combustion gas nozzle valve element in the combustion gas injector can be controlled hydraulically, e.g. indirectly via a pilot valve. Alternatively, a direct control is also conceivable.

In a characterizing manner, the combustion gas injector assembly is configured in the invention to close the combustion gas nozzle valve elements successively at predetermined time offsets, i.e. in particular upon completion of the respective combustion gas injection event. As a result, it is possible to burn residual gas, i.e. unburned combustion gas, which—assuming that the combustion gas injector is in the combustion mode—when one combustion gas nozzle valve element is closed, occurs in the form of a residual gas clouds or cloudlets (in a combustion chamber), by igniting another, still open, combustion gas nozzle valve element at the combustion location of the combustion gas (the term "combustion location" is also to be understood to mean the region of combustion), i.e. during the same, or respective, combustion gas injection event. It is also possible to advantageously reduce the amount of unburned combustion gas, i.e. in comparison to a combustion gas injector assembly from the prior art, in which the combustion gas nozzle valve elements normally close substantially simultaneously. The combustion gas injector assembly is also preferably configured to close the combustion gas nozzle valve elements successively about the circumference (with respect to the combustion gas injector) at predetermined time offsets, i.e. in a predefined direction as well.

The predetermined time offset as well as the direction about the circumference are preferably selected with respect to a combustion chamber spin, i.e. a combustion chamber spin in a combustion chamber provided for use with the combustion gas injector assembly, i.e. in an internal combustion engine. The closing sequence for the combustion gas nozzle valve elements, or a circumferential direction, is preferably selected with respect to a successive closing in accordance with the rotational direction of the combustion chamber spin, or the direction of spin in the combustion chamber to be used with the combustion gas injector assembly, i.e. corresponding to the circumferential direction of the combustion chamber spin direction or the rotational direction of the combustion chamber spin, in particular. As a result, the residual gas from a closed combustion gas nozzle valve element can be transported during the predetermined time offset to the combustion gas nozzle valve element that is to be subsequently closed, on the basis of the combustion chamber spin, i.e. by means of the current of the combustion chamber spin.

The combustion chamber spin can be generated in the combustion chamber in the manner known per se, e.g. by means of at least one intake channel configured as a spin channel, wherein such a combustion chamber spin rotates—about an axial combustion chamber axis—in a predetermined direction of spin. The combustion gas injector assembly is preferably located—in the framework of locating it on the combustion chamber—centrally on the combustion chamber (ceiling), wherein the axial combustion chamber axis is preferably also oriented coaxially to an axial combustion gas injector axis.

With such a design, and also preferably in general, a conveyance of the residual gas on the basis of the combustion chamber spin—from one burning location of a closed combustion gas nozzle valve element to a subsequent, not yet closed, combustion gas nozzle valve element, in particular the next one to close, is provided in this regard, wherein the combustion gas injector assembly is preferably also configured to set the predetermined time offset for the closing to a corresponding period required for the residual gas to travel the distance between combustion locations on the basis of, or depending on, the combustion chamber spin, i.e. a residual gas transport period. In this manner, it can be ensured that it is also possible to ignite the residual gas at the combustion location of the combustion gas nozzle valve element that is to be closed next (during the relevant injection or blowing event), i.e. via a sustained opening thereof over the time period. It should be noted in this regard that the combustion gas injector assembly enables a combustion gas injector control, such that a combustion gas ignition takes place at the combustion location of a combustion gas nozzle valve element predominately at a time when the residual gas cloud transported on the basis of the combustion chamber spin from the previously closed combustion gas nozzle valve element can also be ignited at the combustion location.

The combustion gas injector assembly is also preferably configured to simultaneously open the combustion gas nozzle valve elements in the framework of the respective combustion gas injection event, wherein designs are also possible in which the combustion gas nozzle valve elements are opened at time offsets. The combustion gas nozzle valve elements can also be opened successively in the framework of a temporally offset opening thereof at predetermined opening time offsets, in particular in the same circumferential direction of the time offset closing thereof. The opening (time) windows preferably overlap successive closing combustion gas nozzle valve elements in a temporal manner, such that the flame in the combustion chamber is not extinguished during the combustion gas injection event.

In general, the combustion gas injector assembly can have a control module, which controls the combustion gas injector with the predetermined closing or opening time offsets, e.g. also in the framework of a direct injector control. By way of example, the control unit can be formed by a control device, e.g. a motor control unit or a combustion control unit, in which control device, e.g., combustion chamber spin parameters, such as the spin speed, the spin direction, etc. are stored for setting the predetermined time offset.

Furthermore, according to the invention the combustion gas injector is configured to successively open and/or close the valve elements hydraulically. By way of example, a hydraulic control circuit for the combustion gas nozzle valve elements can be configured such that it has control lines of different lengths leading to the combustion gas nozzle valve elements and/or different (control) choke cross sections upstream of the combustion gas nozzle valve elements.

An internal combustion engine is also proposed with the invention, which has a combustion chamber with a spin, in particular such as that described above, wherein the internal combustion engine has at least one combustion gas injector assembly as described above, and wherein the combustion gas injector, in particular such as that described above, is disposed on the combustion chamber.

The invention also comprises a method for controlling combustion gas nozzle valve elements of a combustion gas injector disposed on a combustion chamber with a spin, wherein the combustion gas nozzle valve elements are closed successively at predetermined time offsets, i.e. in particular during the respective combustion gas injection event. The closing takes place successively thereby, in particular in the direction of spin of the combustion chamber.

The combustion gas nozzle valve elements are preferably controlled with the method such that residual gas, in particular in the form of combustion gas clouds, is transported from a closed combustion gas nozzle valve element, or its combustion location during the predetermined time offset, on the basis of the spin of the combustion chamber, to the subsequent combustion gas nozzle valve element that is to be closed, or its combustion location, wherein it is furthermore provided that the combustion gas nozzle valve elements can be controlled such that the residual gas at a closed combustion gas nozzle valve element, or its combustion location—during the predetermined time offset—is ignited or burned by the combustion gas burn at the subsequent combustion gas nozzle valve element that is to be closed, or its combustion location.

Reference is also made to the explanations regarding the combustion gas injector assembly with respect to the method, which apply to the method accordingly.

Further features and advantages of the invention can be derived from the following description of exemplary embodiments of the invention based on the drawings showing details substantial to the invention, and to the claims. The individual features can be implemented individually or in numerous combinations in variations of the invention.

Preferred embodiments of the invention shall be explained in greater detail below based on the attached drawings. Therein.

In the following description and in the drawings, elements with the same reference symbols have the same or comparable functions.

Figure 1:
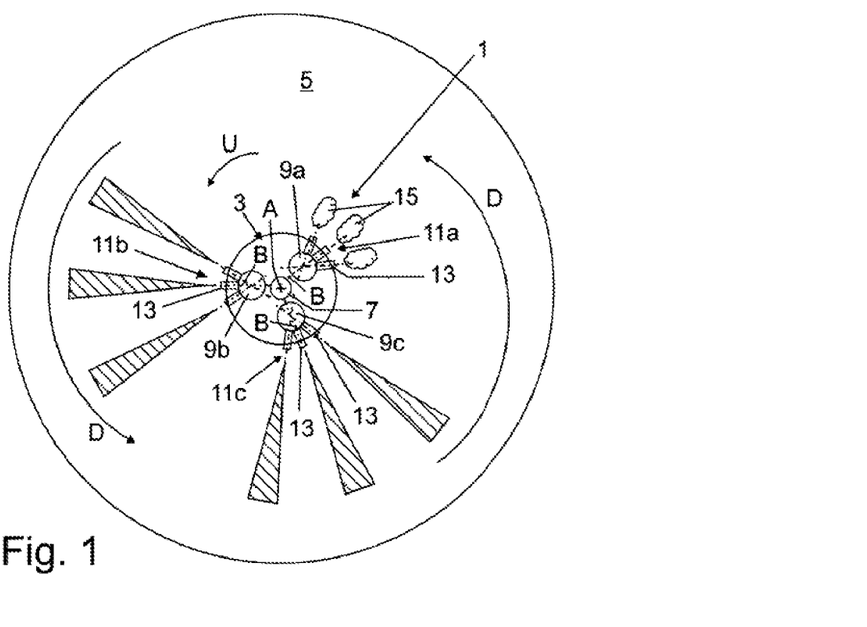
FIG. 1 shows, by way of example and schematically strongly simplified, a combustion gas injector of a combustion gas injector assembly according to the invention, disposed on a combustion chamber of an internal combustion engine according to one possible embodiment of the invention, wherein a combustion gas injection event is illustrated in an operating mode in which a combustion gas nozzle valve element is closed while two further combustion gas nozzle valve elements remain open.
Figure 2:
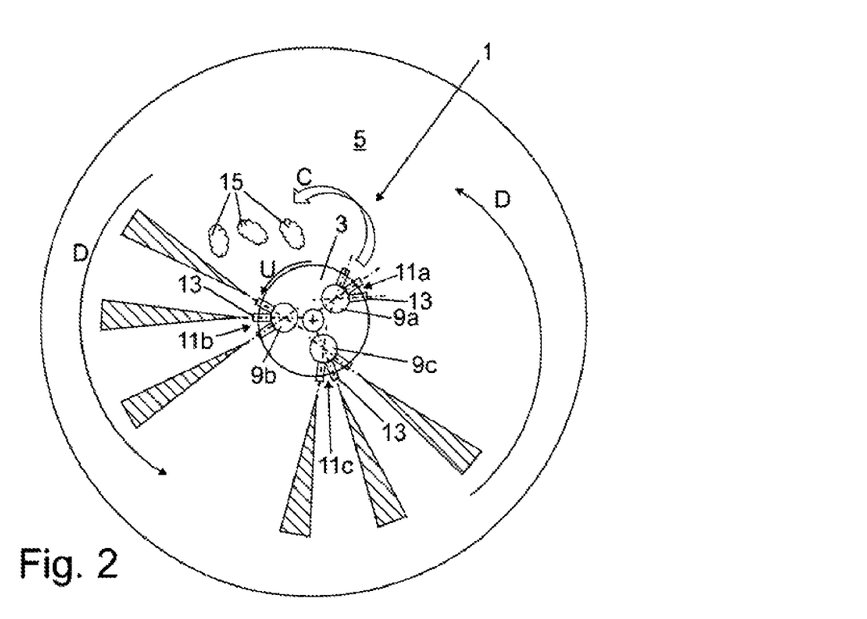
FIG. 2 shows, by way of example and schematically, a view in accordance with FIG. 1, wherein a combustion chamber spin-based residual gas transport to a second, subsequently closed combustion gas nozzle valve element during the combustion gas injection event is illustrated.

FIG. 1 shows a combustion gas injector assembly 1 with a combustion gas injector 3, which is disposed on a combustion chamber 5 of an internal combustion engine, in particular centrally on the ceiling of the combustion chamber 5, which has, e.g., a circular cross section. The combustion gas injector 3 is a multi-needle fuel injector, e.g. formed as part of a dual-fuel fuel injector, which can have a centrally located liquid fuel nozzle valve element 7 (liquid fuel nozzle needle). An (axial) central axis A of the combustion gas injector 3 coincides with the axial axis of the combustion chamber 5, i.e. in the manner of coaxial axes.

The combustion gas injector 3 has a number of combustion gas nozzle valve elements 9a, 9b, 9c about its circumference, in particular disposed evenly over the circumference, three combustion gas nozzle valve elements in the present case, in particular combustion gas nozzle needles. In the present case, the combustion gas nozzle valve needles 9a, b, c are thus offset to one another (over the circumference) at 120°. Embodiments are also possible in which the combustion gas injector 3 has two, four, or more combustion gas nozzle valve elements 9a, b, c distributed over the circumference.

Each of the combustion gas nozzle valve elements 9a, b, c has a dedicated combustion gas nozzle opening group 11a, 11b, and 11c, which has at least one combustion gas nozzle opening 13, in the present case three combustion gas nozzle openings 13, by way of example. Combustion gas can be injected in a substantially radial direction via the respective combustion gas nozzle openings 13. The combustion gas nozzle opening groups are offset 120° to one another with respect to a radial central axis B of the respective combustion gas nozzle opening groups. As a result, an even combustion gas distribution is obtained in the combustion chamber over 360° in the framework of a combustion gas injection via the combustion gas nozzle openings 13.

The respective combustion gas nozzle valve elements 9a, b, c can be controlled in a lifting manner, i.e. axially, to open and close the dedicated combustion gas nozzle openings 13, or for selective injection of combustion gas via the combustion gas nozzle openings 13. The combustion gas nozzle valve elements 9a, b, c can each act against a valve seat (not shown) thereby. The combustion gas nozzle valve elements 9a, b, c can be controlled, e.g. by a control device (not shown) for the combustion gas injector assembly 1. It should be noted here that the combustion gas nozzle valve elements 9a, b, c are always all opened for each combustion gas injection event with the proposed combustion gas injector assembly 1, i.e. for a injection via all of the combustion gas nozzle openings 13.

In order to obtain, in particular, an improved burning of the residual gas with respect to prior known combustion gas injector assemblies, the combustion gas injector assembly 1 is configured to successively close the combustion gas nozzle valve elements 9a, b, c at predetermined time offsets T, i.e. in particular in corresponding to a completion of a respective injection event. The valve elements are closed thereby along the circumference U in particular, i.e. with respect to the combustion gas injector 3.

This shall be explained below in greater detail in reference to FIGS. 1 to 4. A combustion chamber spin is illustrated in these figures, which has a combustion chamber spin direction, indicated by arrow D, which prevails in the combustion chamber 5 during the combustion gas mode of an associated internal combustion engine, and also when the combustion gas injector assembly 1 is used on the combustion chamber 5.

An operating state of the combustion gas injector 3 is illustrated in FIG. 1, in which a first combustion gas nozzle valve element 9a is already closed within the a combustion gas injection event, while the two other—upstream in the direction of the combustion chamber spin D—combustion gas nozzle valve elements 9b, 9c remain open (the shaded triangles illustrate the injected combustion gas). Residual gas clouds 15 are formed at the combustion location of the closed combustion gas nozzle valve element 9a (close to the nozzle openings 13), which are not burned in the combustion chamber 5 at the combustion location of the closed combustion gas nozzle valve element 9a.

In order to then burn off this residual gas 15 during the current combustion gas injection event, the subsequent combustion gas nozzle valve element 9b in the combustion chamber spin direction D is subsequently closed, in particular with a predetermined time offset T (i.e. during the ongoing combustion gas injection event). The time offset T is selected such that when the residual gas clouds 15 arrive at the combustion location, carried along on the current of the combustion gas spin, of the successive combustion gas nozzle valve element 9b in the combustion chamber spin direction D, which is to be closed subsequently, see FIG. 2, the residual gas 15 is ignited. For this, the closing sequence of the combustion gas nozzle valve elements 9a, b, c is selected along the circumference U such that it corresponds to the combustion chamber spin direction D, or the direction of spin of the spin current, cf. FIGS. 1 to 4.

Figure 3:
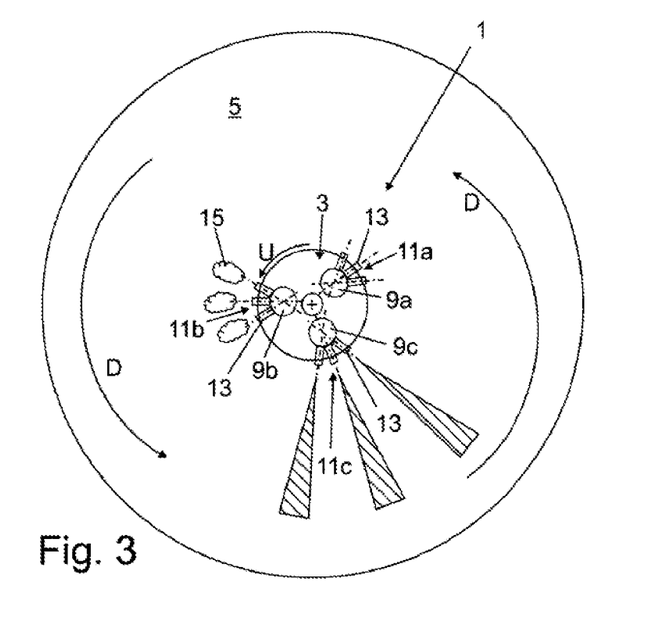
FIG. 3 shows, by way of example and schematically, a view analogous to that in FIG. 1, illustrating an operating mode during the combustion gas injection event, in which the second combustion gas nozzle valve element is closed.

FIG. 3 illustrates an operating state of the combustion gas injector 3 (during the ongoing combustion gas injection event), in which the second combustion gas nozzle valve element 9b is also closed, while the subsequent, final combustion gas nozzle valve element 9c in the combustion chamber spin direction D remains open. Residual gas clouds 15 are also formed at the combustion location of the closed, second combustion gas nozzle valve element 9b (close to the nozzle openings 13).

Figure 4:
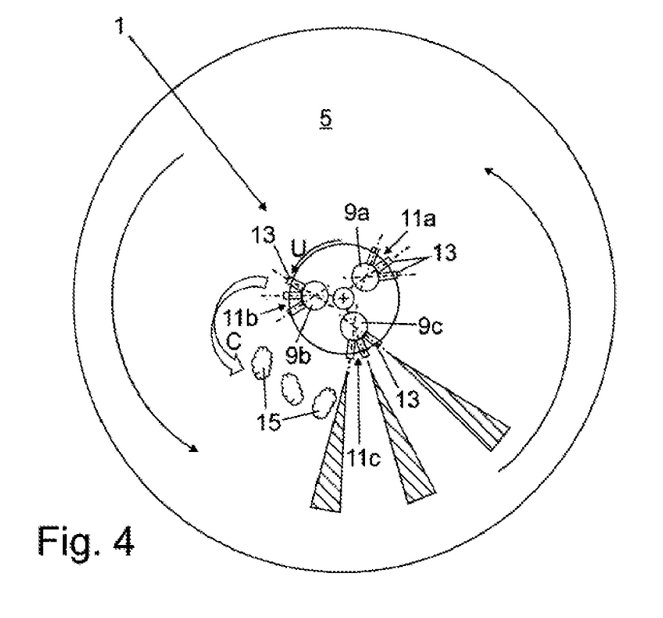
FIG. 4 shows, by way of example and schematically, a view analogous to that in FIG. 2, illustrating a combustion chamber spin-based residual gas transport to the third combustion gas nozzle valve element that is to be closed subsequently during the combustion gas injection event.

In order to also burn this residual gas 15, cf. FIG. 4, the final combustion gas nozzle valve element 9c is also first closed when the residual gas 15 conveyed by the combustion chamber spin current on the part of the second combustion gas nozzle valve element 9b is ignited at the combustion location of the final combustion gas nozzle valve element 9c. In this regard, the final combustion gas nozzle valve element 9c is closed after the previous one, at which point the current combustion gas injection event is then completed. Here as well, the time offset for closing the valve elements is again selected such that an ignition of the residual gas 15 is always ensured. The predetermined time offset T between the respective successively closed combustion gas nozzle valve elements 9a, b, c is preferably also selected such that it is uniform.

Figure 5:
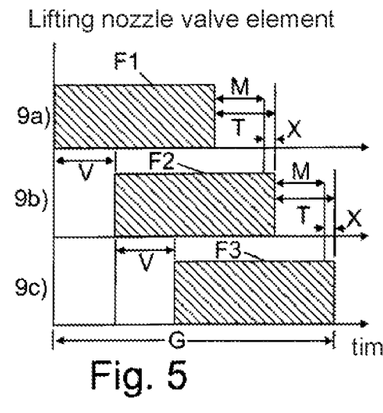
FIG. 5 shows, by way of example and schematically, a diagram illustrating the opening windows of the respective combustion gas nozzle valve elements of the combustion gas injector assembly during a combustion gas injection event in accordance with a first possible design of the invention.
Figure 6:
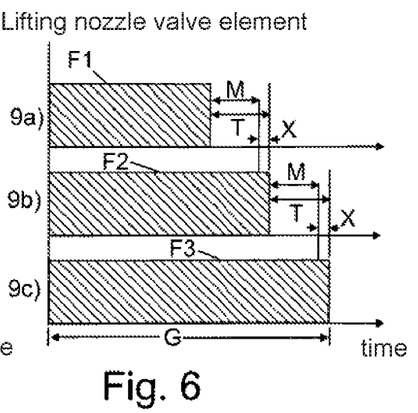
FIG. 6 shows, by way of example and schematically, a diagram analogous to FIG. 5, which illustrates opening windows in accordance with a further possible design of the invention.

At this point, diagrams are explained in reference to FIGS. 5 and 6, which illustrate by way of example, possible opening (time) windows in the framework of a combustion gas nozzle valve element control of a combustion gas injection event with the participation of the three combustion gas nozzle valve elements 9a, b, c, i.e. a combustion gas injector assembly 1 according to the invention.

As shown in FIG. 5, the combustion gas nozzle valve elements 9a, b, c, which are closed successively at predetermined time offsets T, can also be opened at predetermined opening time offsets V, i.e. successively. The successive opening thereof also takes place in the combustion chamber spin direction D. The opening windows F1, F2, F3 overlap thereby, such that the flame in the combustion chamber 5 is not extinguished over the entire period G of the combustion gas injection event.

It can furthermore be seen in FIG. 5 that the predetermined time offset T for closing the combustion gas nozzle valve elements 9a, b, c can comprise a period X, which is added to a time period M as a safety buffer, wherein the time period M preferably represents the maximal period required for transporting the residual gas on the basis of the combustion chamber spin, or the combustion chamber spin-based residual gas transport, between the successively closing combustion gas nozzle valve elements 9a, b, c, or their combustion locations. In this regard, the predetermined time offset T can be composed of the maximum conveyance period M and a safety time window X, or time buffer. The maximum conveyance period M can be determined mathematically based on the spin speed in the combustion chamber, or it can be determined empirically (corresponding values can also be derived, e.g. from a combustion control).

FIG. 6 shows a diagram illustrating the simultaneous opening of the combustion gas nozzle valve elements 9a, b, c in the framework of a preferred embodiment, at the start of a combustion gas injection event, which are also successively closed with a predetermined time offset T. It is also ensured thereby that the flame in the combustion chamber 5 is not extinguished over the entire period D of the combustion gas injection event. It should also be noted that the above explanations also apply with respect to the selection of the predetermined time offset T for closing the valve elements—as was also the case for FIG. 5.

Figure 7:
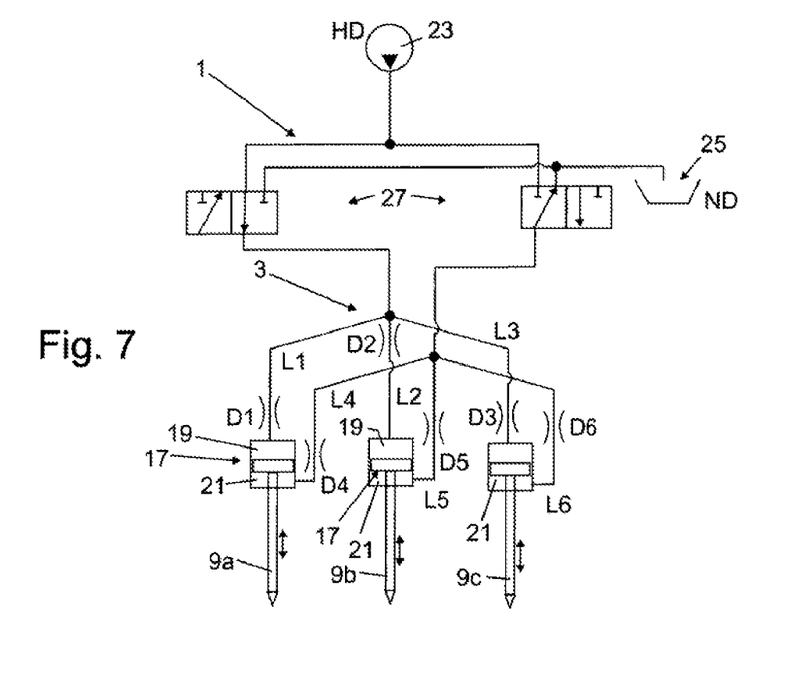
FIG. 7 shows, by way of example and schematically, a structural diagram, focusing on a hydraulic control circuit for a combustion gas injector for causing a temporally offset closing of the combustion gas nozzle valve elements in accordance with one possible design of the invention.

FIG. 7 illustrates, by way of example and schematically strongly simplified, the combustion gas injector 3, including the hydraulic control circuit, wherein the respective combustion gas nozzle valve elements 9a, b, c can be opened or closed via a respective piston control unit 17, for example. High pressure (from a high pressure (HD) source 23) or low pressure (ND; leakage 25) can be applied in an alternating manner to a respective first control chamber 19 of the piston control unit 17 and a respective second control chamber 21 of the piston control unit 17, i.e. via a pilot valve assembly 27, wherein the combustion gas nozzle valve elements 9a, b, c are closed when the respective first control chambers 19 are subjected to a (hydraulic) load, and the respective second control chambers 21 are simultaneously relieved of pressure, and wherein the combustion gas nozzle valve elements 9a, b, c are opened when the respective second control chambers 21 are subjected to a load, and the respective first control chambers 19 are simultaneously relieved of pressure.

In order to cause the temporally offset closing according to the invention, the hydraulic control circuit can be configured appropriately, i.e. with regard to the lengths of the lines and the choke devices D1-D6 in the flow paths to the respective control chambers 19 and 21. By way of example, the line length L1 can be shorter than the line length L2, and this in turn can be shorter than the line length L3. Alternatively or additionally, the line length L4 can be shorter than the line length L5, which in turn can be shorter than the line length L6.

Furthermore alternatively or additionally, the choke cross section, for example, for choke D1 can be larger than the choke cross section of choke D2, which in turn is larger than the choke cross section of choke D3, and again alternatively or additionally, the choke cross section of choke D4 can be larger than the choke cross section of choke D5, which in turn is larger than the choke cross section of choke D6.

A time offset can be obtained via these adjustment possibilities in the building up of pressure or relieving thereof at the control chambers of the combustion gas nozzle valve elements 9a, b, c, such that the combustion gas nozzle valve elements 9a, 9b, 9c are also closed successively in the sequence 9a, 9b, 9c with the intended adjustments.

Figure 8:
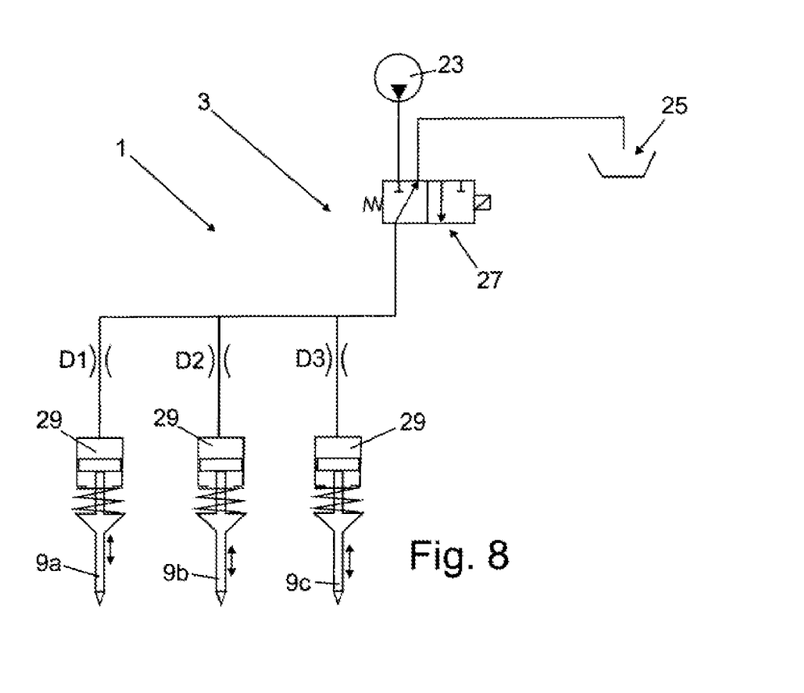
FIG. 8 shows, by way of example and schematically, a structural diagram analogous to that in FIG. 7 of a further possible design of the invention.

FIG. 8 shows an alternative possible embodiment of the combustion gas injector 3, including the hydraulic control circuit, wherein the respective combustion gas nozzle valve elements 9a, b, c can each be pressurized and relieved via just one control chamber 29, and wherein the closing force is supported by a closing spring 31. With such an embodiment, a predetermined time offset T can also be set in a targeted manner via a suitable selection of the spring properties of the respective closing springs 31, as well as via the line lengths and/or the choke cross sections.

LIST OF REFERENCE SYMBOLS 1 combustion gas injector assembly
3 combustion gas injector
5 combustion chamber
7 liquid fuel nozzle valve element
9a (first) combustion gas nozzle valve element
9b (second) combustion gas nozzle valve element
9c (third) combustion gas nozzle valve element
11a, b, c combustion gas nozzle opening groups
13 combustion gas nozzle opening
15 residual gas cloud
17 piston control unit
19 first control chamber
21 second control chamber
23 high pressure source
25 leakage
27 pilot valve (assembly)
29 control chamber
31 closing spring
A axial axis
B radial axis
C residual gas transport
D combustion chamber spin direction
F1, F2, F3 opening window
G overall period
M time period
T time offset (closing)
U circumferential direction
V time offset (opening)
X safety buffer
D1-D6 choke devices
L1-L6 lines

The invention claimed is:

1. A combustion gas injector assembly comprising a combustion gas injector located on an inner wall of a combustion chamber, which has a plurality of combustion gas nozzle opening groups distributed over an outer circumference of the combustion gas injector, each combustion gas nozzle opening of the plurality of combustion gas nozzle opening groups having at least one combustion gas nozzle opening, wherein a respective combustion gas nozzle opening group is dedicated to a combustion gas nozzle valve element of the combustion gas injector that can be closed and opened for selective combustion gas injection into the combustion chamber via its at least one combustion gas nozzle opening, wherein the combustion gas injector assembly is configured to successively close each combustion gas nozzle valve element with a predetermined time offset.

2. The combustion gas injector assembly of claim 1, wherein the combustion gas injector assembly is configured to successively close the combustion gas nozzle valve elements along the outer circumference of the combustion gas injector with the predetermined time offset.

3. The combustion gas injector assembly of claim 1, wherein the combustion gas injector assembly is configured to successively open the combustion gas nozzle valve elements with a predetermined opening time offset.

4. The combustion gas injector assembly of claim 1, wherein the combustion gas injector assembly is configured to set the predetermined time offset to correspond to a residual gas transport period, dependent on a combustion chamber spin of the combustion chamber, between combustion locations of each combustion gas nozzle valve element that is to be closed successively.

5. The combustion gas injector assembly of claim 1, wherein residual gas at the combustion gas nozzle valve element, when closed, is transported based on a combustion chamber spin during the predetermined time offset to a combustion location of the combustion gas nozzle valve element that is to be subsequently closed.

6. The combustion gas injector assembly of claim 1, wherein the predetermined time offset contains a safety period.

7. The combustion gas injector assembly of claim 1, wherein the combustion gas injector assembly has a control unit, which controls the combustion gas injector with the predetermined time offset.

8. The combustion gas injector assembly of claim 1, wherein the combustion gas injector is appropriately configured to hydraulically actuate each combustion gas valve element successively.

9. The combustion gas injector assembly of claim 8, wherein the combustion gas injector causes each combustion gas valve element to be actuated successively by means of control lines of different lengths.

10. An internal combustion engine that has at least one combustion chamber subjected to a combustion chamber spin, wherein at least one combustion gas injector assembly comprises a combustion gas injector located on an inner wall of the combustion chamber and having a plurality of combustion gas nozzle opening groups distributed over an outer circumference of the combustion gas injector, each combustion gas nozzle opening of the plurality of combustion gas nozzle opening groups having at least one combustion gas nozzle opening wherein a respective combustion gas nozzle opening group is dedicated to a combustion gas nozzle valve element of the combustion gas injector that can be closed and opened for selective combustion gas injection into the combustion chamber via its at least one combustion gas nozzle opening, wherein the combustion gas injector assembly is configured to successively close each combustion gas nozzle valve element with a predetermined time offset, wherein the combustion gas injector is located on the combustion chamber.

11. A method for controlling a combustion gas nozzle valve of a combustion gas injector, having a plurality of combustion gas nozzle opening groups distributed over an outer circumference of the combustion gas injector and located on an inner wall of a combustion chamber subjected to a combustion chamber spin, wherein each combustion gas nozzle opening of the plurality of combustion gas nozzle opening groups has at least one combustion gas nozzle opening and a respective combustion gas nozzle opening group is dedicated to a combustion gas nozzle valve element of the combustion gas injector that can be closed and opened for selective combustion gas injection into the combustion chamber via its at least one combustion gas nozzle opening, and each of the combustion gas nozzle valve elements are successively closed with a predetermined time offset.

12. The method of claim 11, wherein each of the combustion gas nozzle valve elements is successively closed in a combustion chamber spin direction with the predetermined time offset.

13. The method of claim 11, wherein a each of the combustion gas nozzle valve elements is controlled such that residual gas at a closed one of the combustion gas nozzle valve elements is transported during the predetermined time offset to a combustion location of a subsequent one of the combustion gas nozzle valve elements that is to be closed based on the combustion chamber spin.

14. The method of claim 11, wherein each combustion gas nozzle valve element is controlled such that residual gas at a closed combustion gas nozzle valve element is ignited during the predetermined time offset by burning combustion gas at a subsequent combustion gas nozzle valve element that is to be closed.

15. The combustion gas injector assembly of claim 1, wherein the combustion gas injector assembly is configured to open each combustion gas nozzle valve element without a predetermined opening time offset.

16. The combustion gas injector assembly of claim 1, wherein a closing sequence of each combustion gas nozzle valve element, or a circumferential direction, is selected with respect to a successive closing in accordance with a spin direction in a combustion chamber to be used with the combustion gas injector assembly.

17. The combustion gas injector assembly of claim 1, wherein the combustion gas injector assembly is configured to ignite residual gas at the combustion gas nozzle valve element, when used with the combustion chamber, during the predetermined time offset by the combustion gas burning at a combustion location of a subsequent combustion gas nozzle valve element that is to be closed.

18. The combustion gas injector assembly of claim 8, wherein the combustion gas injector causes each combustion gas valve element to be actuated successively by means of different choke cross sections in a hydraulic control circuit.

* * * * *

UNITED STATES PATENT AND TRADEMARK OFFICE
CERTIFICATE OF CORRECTION

| | | |
|---|---|---|
| PATENT NO. | : 10,495,008 B2 | Page 1 of 1 |
| APPLICATION NO. | : 16/073724 | |
| DATED | : December 3, 2019 | |
| INVENTOR(S) | : Ingmar Joachim Berger et al. | |

It is certified that error appears in the above-identified patent and that said Letters Patent is hereby corrected as shown below:

In the Specification

Column 1, Line 12, below "reference." insert -- DESCRIPTION --;

Column 1, Line 37, delete "claim" and insert -- claim 1, --;

Column 1, Line 65, delete "each—" and insert -- —each --;

Column 6, Line 67, delete "for" and insert -- T for --.

Signed and Sealed this
Seventh Day of April, 2020

Andrei Iancu
*Director of the United States Patent and Trademark Office*